United States Patent
Han et al.

(10) Patent No.: US 12,218,345 B2
(45) Date of Patent: Feb. 4, 2025

(54) HIGH-NICKEL ELECTRODE SHEET AND METHOD FOR MANUFACTURING SAME

(71) Applicant: LG ENERGY SOLUTION, LTD., Seoul (KR)

(72) Inventors: Song Yi Han, Daejeon (KR); Ji Hoon Ryu, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 559 days.

(21) Appl. No.: 17/631,266

(22) PCT Filed: Apr. 20, 2021

(86) PCT No.: PCT/KR2021/004953
§ 371 (c)(1),
(2) Date: Jan. 28, 2022

(87) PCT Pub. No.: WO2021/225303
PCT Pub. Date: Nov. 11, 2021

(65) Prior Publication Data
US 2022/0328808 A1    Oct. 13, 2022

(30) Foreign Application Priority Data

May 7, 2020   (KR) .................. 10-2020-0054232
Apr. 8, 2021  (KR) .................. 10-2021-0045784

(51) Int. Cl.
*H01M 4/36*     (2006.01)
*H01M 4/04*     (2006.01)
(Continued)

(52) U.S. Cl.
CPC ......... *H01M 4/366* (2013.01); *H01M 4/0404* (2013.01); *H01M 4/0435* (2013.01);
(Continued)

(58) Field of Classification Search
CPC .......... H01M 10/052; H01M 10/0525; H01M 2004/021; H01M 2004/028;
(Continued)

(56) References Cited

U.S. PATENT DOCUMENTS

| 2015/0162598 A1* | 6/2015 | Kim ..................... H01M 4/62 429/231.1 |
| 2015/0340732 A1 | 11/2015 | Kim et al. |
| 2016/0056463 A1 | 2/2016 | Tsuji et al. |
| 2017/0162866 A1 | 6/2017 | Saka et al. |

FOREIGN PATENT DOCUMENTS

| JP | 2009-245772 A | 10/2009 |
| JP | 2014-207201 A | 10/2014 |

(Continued)

OTHER PUBLICATIONS

International Search Report (with partial translation) and Written Opinion dated Aug. 3, 2021 issued in corresponding International Patent Application No. PCT/KR2021/004953.
(Continued)

*Primary Examiner* — Lingwen R Zeng
(74) *Attorney, Agent, or Firm* — MORGAN, LEWIS & BOCKIUS LLP (57) ABSTRACT

The present invention relates to an electrode sheet comprising: a first cathode mixture layer which is formed in a central portion of a holding part and contains a first cathode active material of lithium nickel cobalt manganese oxide; and a second cathode mixture layer which is formed at one end or both ends of the first cathode mixture layer and contains a second cathode active material lower in nickel content than the first cathode active material, wherein a rolling density b of the second cathode mixture layer is lower than a rolling density a of the first cathode mixture layer, whereby the electrode sheet has the effect of improving the energy density while suppressing a reaction with water.

15 Claims, 1 Drawing Sheet

(51) Int. Cl.
    *H01M 4/505*     (2010.01)
    *H01M 4/525*     (2010.01)
    *H01M 10/0525*     (2010.01)
    *H01M 4/02*     (2006.01)
    *H01M 4/131*     (2010.01)
    *H01M 10/052*     (2010.01)

(52) U.S. Cl.
    CPC ........... *H01M 4/505* (2013.01); *H01M 4/525* (2013.01); *H01M 10/0525* (2013.01); *H01M 2004/021* (2013.01); *H01M 2004/028* (2013.01); *H01M 4/131* (2013.01); *H01M 10/052* (2013.01); *Y02E 60/10* (2013.01)

(58) Field of Classification Search
    CPC .. H01M 4/0404; H01M 4/0435; H01M 4/131; H01M 4/366; H01M 4/505; H01M 4/525; Y02E 60/10
    See application file for complete search history.

(56) References Cited

FOREIGN PATENT DOCUMENTS

| | | |
|---|---|---|
| JP | 6054517 B2 | 12/2016 |
| JP | 2019-149269 A | 9/2019 |
| KR | 10-1540673 B1 | 7/2015 |
| KR | 10-1687190 B1 | 12/2016 |
| KR | 10-1792642 B1 | 11/2017 |

OTHER PUBLICATIONS

Office Action issued in related Chinese Patent Application No. 202180004573.X dated Aug. 9, 2023.

Extended European Search Report issued in corresponding European Patent Application No. 21800675.7 dated Sep. 23, 2022.

\* cited by examiner

HIGH-NICKEL ELECTRODE SHEET AND METHOD FOR MANUFACTURING SAME

TECHNICAL FIELD

This application claims the benefit of priority based on Korean Patent Application No. 10-2020-0054232 filed on May 7, 2020 and Korean Patent Application No. 10-2021-0045784 filed on Apr. 8, 2021, and the content of these Korean Patent Applications are incorporated herein as part of the present specification.

The present invention relates to a high-nickel electrode sheet and a method of manufacturing the same, and more particularly, to an electrode sheet, which is manufactured by applying a first positive electrode active material slurry having a high nickel content on a central portion of an electrode sheet coated part, and applying a second positive electrode active material slurry having a relatively lower nickel content than the first positive electrode active material on the edge portion of the coated part, and a method of manufacturing the same.

BACKGROUND ART

Recently, as electronic devices using batteries such as mobile phones, notebook computers and electric vehicles are rapidly distributed, demand for secondary batteries, which are small and lightweight and have a relatively high capacity, has also rapidly increased. In particular, since the lithium secondary battery is lightweight and has a high-energy density, it has attracted a lot of interest as a driving power source of portable devices. As a result, research and development efforts are actively conducted to improve the performance of lithium secondary batteries.

In the lithium secondary battery, in a state that an organic electrolyte solution or a polymer electrolyte solution is charged in a space between a positive electrode and a negative electrode which are made of an active material in which lithium ions may be intercalated and deintercalated, electric energy is generated by oxidation and reduction reactions when lithium ions are intercalated/deintercalated in the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), lithium iron phosphate compound ($LiFePO_4$) and the like were used as the positive electrode active material of a lithium secondary battery. Further, as a method for improving a low thermal stability while maintaining the excellent reversible capacity of $LiNiO_2$, a lithium composite metal oxide (hereinafter, referred to as "NCM-based lithium composite transition metal oxide"), which was generated by substituting a part of nickel (Ni) with cobalt (Co) and manganese (Mn), was developed. However, the conventional NCM-based lithium composite transition metal oxide was not sufficient in capacity characteristics and thus has a limit in its application.

In order to improve such a problem, in recent years, research is conducted to increase the content of nickel in the NCM-based lithium composite transition metal oxide. As the content of nickel increases, the energy density per volume increases, but in the case of a high concentration nickel positive electrode active material, there is a problem that the structural stability and the chemical stability of the active material are low, which again rapidly deteriorates the thermal stability. Further, nickel ions react with moisture and carbon dioxide present in the storage environment, and irreversibly switched to NiO, and in this process, lithium ions exit, and lithium byproducts existing in the form of LiOH and $Li_2CO_3$ increase. As such, the resistance of the surface of the active material increases, the capacity of the battery decreases, and gas generation during high temperature storage increases.

As such, when manufacturing a high-nickel positive electrode active material electrode having a high content of nickel, in order to relieve moisturization, Japanese Patent Publication No. 2019-149269 discloses a secondary battery including a positive electrode, in which a first positive electrode active material having a nickel content of 50 to 80% is applied in the center, and a second positive electrode active material a nickel content of 20 to 40% is applied at both ends. However, the conventional technology has the effect of suppressing the precipitation of lithium, but it is not sufficient for improving the lifespan of the battery, and the second positive electrode active material applied to both ends has the nickel content of only 20 to 40%, and thus it is difficult to implement the desired energy density.

Therefore, in a positive electrode having a high content of nickel, it is necessary to develop a battery capable of inhibiting reaction with moisture while implementing a high energy density.

DISCLOSURE

Technical Problem

The present invention has been created to solve the above problems, and an object of the present invention is to provide an electrode sheet capable of suppressing reaction between the positive electrode active material having a high nickel content and moisture and implementing a high energy density, and a method of manufacturing the same.

Technical Solution

The present invention relates to an electrode sheet of a high-nickel positive electrode, and the electrode sheet according to the present invention includes a non-coated part and a coated part in which a positive electrode mixture layer is applied on at least one surface of a current collector, and the coated part includes: a first positive electrode mixture layer configured to be formed on a central portion along a longitudinal direction of the electrode sheet and to contain a first positive electrode active material of lithium-nickel-cobalt-manganese oxide; and a second positive electrode mixture layer configured to be formed at one or two ends of the first positive electrode mixture layer and to contain a second positive electrode active material having a nickel content lower than that of the first positive electrode active material, and a rolling density (b) of the second positive electrode mixture layer is smaller than a rolling density (a) of the first positive electrode mixture layer.

In an embodiment of the present invention, a nickel content in the first positive electrode active material corresponds to 70 mol % or more of an entire transition metal content in the first positive electrode active material.

In an embodiment of the present invention, a nickel content in the second positive electrode active material may correspond to less than 70 mol % of an entire transition metal content in the second positive electrode active material, and may preferably correspond to 45 to 60 mol % of an entire transition metal content in the second positive electrode active material.

In an embodiment of the present invention, a ratio (b/a) of a rolling density (b) of the second positive electrode mixture layer to a rolling density (a) of the first positive electrode mixture layer is 0.5 to 0.9.

In an embodiment of the present invention, a rolling density (a) of the first positive electrode mixture layer corresponds to 2.5 g/cm$^3$ to 4.3 g/cm$^3$.

In an embodiment of the present invention, a width of the second positive electrode mixture layer corresponds to 1 to 15% of a width of the first positive electrode mixture layer.

A lithium secondary battery according to the present invention includes a positive electrode generated by cutting the coated part and the non-coated part of the electrode sheet according to a shape and a size of a unit electrode.

A method of manufacturing an electrode sheet according to the present invention includes: an application process of forming a first positive electrode mixture layer and a second positive electrode mixture layer by applying a first positive electrode slurry containing the first positive electrode active material and a second positive electrode slurry containing the second positive electrode active material on a current collector sheet; a drying process; and a rolling process, wherein, in the application process, the second positive electrode slurry is applied in a direction parallel to an application direction of the first positive electrode slurry at one or both ends of the first positive electrode slurry, based on a width direction of the electrode sheet, and wherein in the rolling process, a rolling density of the second positive electrode mixture layer is smaller than a rolling density of the first positive electrode mixture layer.

Herein, in the application process, a nickel content in the second positive electrode active material may correspond to 45 to 60 mol % of an entire transition metal content in the second positive electrode active material.

Herein, in the application process, a loading amount per unit area of the second positive electrode mixture layer is smaller than a loading amount per unit area of the first positive electrode mixture layer.

Herein, in the application process, a ratio (B/A) of the loading amount (B) per unit area of the second positive electrode mixture layer to the loading amount (A) per unit area of the first positive electrode mixture layer corresponds to 0.7 to 0.99.

Herein, a ratio (b/a) of a rolling density (b) of the second positive electrode mixture layer to a rolling density (a) of the first positive electrode mixture layer 0.5 to 0.9.

Herein, in the application process, a length of a width of the second positive electrode mixture layer corresponds to 1 to 15% of a length of a width of the first positive electrode mixture layer.

Herein, in the application process, the first positive electrode slurry and the second positive electrode slurry may be simultaneously applied.

Advantageous Effects

According to an electrode sheet and a method of manufacturing the electrode sheet of the present invention, by setting the rolling density (b) of a second positive electrode mixture layer formed on the edges of the coated part, which has a relatively high possibility to contact moisture outside the sheet, to be smaller than the rolling density (a) of the first positive electrode mixture layer formed on the central portion of the coated part, generation of fine powder in the second positive electrode mixture layer was reduced, which suppressed the increase in the surface area of the positive electrode active material which may adsorb moisture after rolling, thereby improving energy density while minimizing reaction with moisture.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention relates to an electrode sheet of a high-nickel positive electrode, and the electrode sheet according to the present invention includes a non-coated part and a coated part in which a positive electrode mixture layer is applied on at least one surface of a current collector, and the coated part includes: a first positive electrode mixture layer configured to be formed on a central portion along a longitudinal direction of the electrode sheet and to contain a first positive electrode active material of lithium-nickel-cobalt-manganese oxide; and a second positive electrode mixture layer configured to be formed at one or two ends of the first positive electrode mixture layer and to contain a second positive electrode active material having a nickel content lower than that of the first positive electrode active material, and a rolling density (b) of the second positive electrode mixture layer is smaller than a rolling density (a) of the first positive electrode mixture layer.

Generally, the electrode sheet, which is generated by applying an electrode active material slurry on a current collector sheet, and then performing a drying and rolling process, is wound into a roll and stored in a wound state until punching the electrode for the assembly of a battery. At this time, moisture may be more easily permeated in both ends than in the central portion of the coated part, based on the width direction, and thus the moisture content is higher in both ends than in the central portion.

In NCM-based lithium composite transition metal oxide, based on the fact that when the nickel content among the entire transition metal content is less than 70 mol %, the reaction speed with the moisture is low, a second positive electrode mixture layer containing a second positive electrode active material of a nickel-cobalt-manganese transition metal oxide having a nickel content of less than 70 mol % was arranged on one or both edge portions of the electrode sheet coated part to reduce the moisture permeation, and a first positive electrode mixture layer containing a first positive electrode active material of a nickel-cobalt-manganese transition metal oxide having a nickel content of 70 mol % or more was arranged on the central portion of the electrode sheet coated part to implement a high energy density, and the rolling density of the second positive electrode mixture layer was set to be smaller than the rolling density of the first positive electrode mixture layer, thereby implementing a high energy density while suppressing the moisture reaction.

Figure 1:
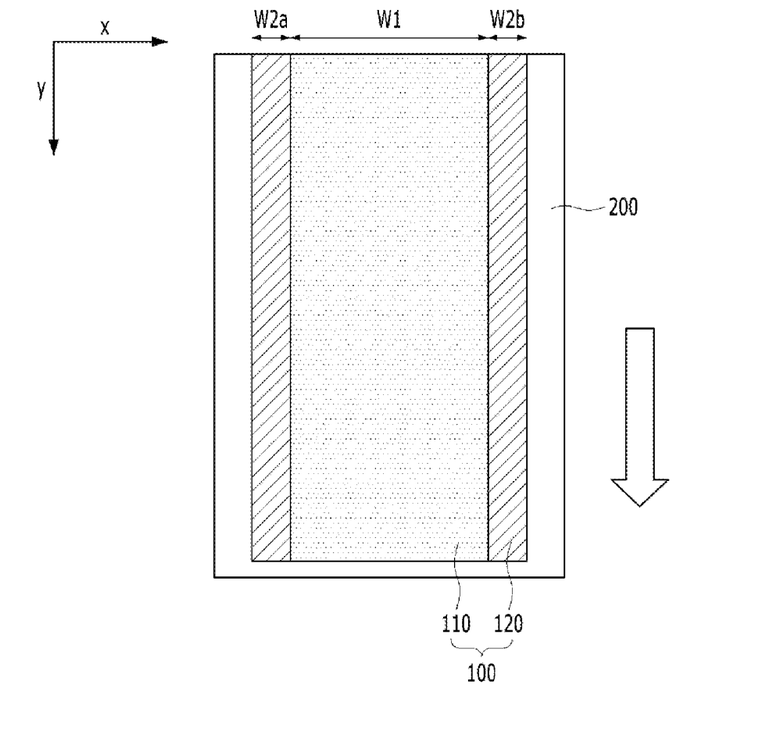
FIG. 1 is a planar schematic diagram illustrating an example of an electrode sheet according to an embodiment of the present invention.

Referring to FIG. 1, the electrode sheet of the present invention has a coated part 100 where the positive electrode mixture layer has been applied on at least one surface of the current collector and a non-coated part 200. Further, the coated part 100 is formed of a first positive electrode mixture layer 110 formed on the central portion along the longitudinal direction (y axis) of the electrode sheet, and a second positive electrode mixture layer 120 formed at both ends of the first positive electrode mixture layer 110. Herein, both ends mean both sides based on the width direction (x axis) of the electrode sheet. FIG. 1 illustrates an embodiment in which the second positive electrode mixture layer is formed at both ends of the first positive electrode mixture layer, but not limited thereto, and the second positive electrode mixture layer may be formed at one end of the first positive electrode mixture layer.

The first positive electrode active material of the present invention is a lithium-nickel-cobalt-manganese transition metal oxide, and the content of nickel preferably corresponds to 70 mol % or more of the entire transition metal for the implementation of a high energy density.

The second positive electrode active material of the present invention is a lithium-nickel-cobalt-manganese transition metal oxide, and the content of nickel preferably corresponds to less than 70 mol %, more preferably 45 to 60 mol %, of the entire transition metal in order to suppress reaction with moisture. Conventionally, the reactivity with moisture was suppressed by setting the nickel content of the second positive electrode active material to 40% or less, but according to the present invention, a high energy density was implemented and at the same time, reactivity with moisture was suppressed by increasing the nickel content in the second positive electrode active material through control of rolling density of the first positive electrode mixture layer and the second positive electrode mixture layer.

The first positive electrode active material and the second positive electrode active material of the present invention are particles (powder). The average particle diameter $D_{50}$ of the first positive electrode active material particles may be 1 to 30 μm, preferably 3 to 20 μm, and more preferably 5 to 15 μm. In the present invention, the average particle diameter $D_{50}$ may be defined as a particle diameter corresponding to 50% of the volume accumulation amount in the particle diameter distribution curve. The average particle diameter $D_{50}$ may be measured using, for example, a laser diffraction method. For example, according to the method of measuring the average particle size ($D_{50}$) of the positive electrode active material, after dispersing particles of the positive electrode active material in a dispersion medium, the ultrasonic waves of about 28 kHz are irradiated with the output of 60 W by introducing a commercially available laser diffraction particle size measuring apparatus (e.g., Microtrac MT 3000), and then the average particle size ($D_{50}$) corresponding to 50% of the volume accumulation amount in the measuring apparatus may be calculated.

The average particle diameter $D_{50}$ of the second positive electrode active material particles may be 1 to 30 μm, preferably 3 to 20 μm, and more preferably 5 to 15 μm.

The present invention is characterized in that the rolling density (b) of the second positive electrode mixture layer containing the second positive electrode active material is smaller than the rolling density (a) of the first positive electrode mixture layer containing the first positive electrode active material. Herein, the rolling density is defined as the density of the positive electrode after rolling. The rolling density can be calculated by collecting positive electrodes of a specific area and measuring the mass and thickness (volume) of the positive electrodes.

In an embodiment of the present invention, the rolling density of the first positive electrode mixture layer may be 2.5 g/cm$^3$ to 4.3 g/cm$^3$. The rolling density of the second positive electrode mixture layer may be 2.3 to 4.1 g/cm$^3$.

The positive electrode active material particles may be deformed or broken by the force applied during the rolling. As particles are broken, the specific surface area of the positive electrode active material particles increases, which also increases the surface area which may react with moisture. As such, in the present invention, in order to suppress the phenomenon that fine powder is generated during the rolling process, when applying the second positive electrode slurry on the second positive electrode mixture layer which is arranged on the edge portion of the coated part having a high possibility to contact moisture, the loading amount of the second positive electrode slurry is set to be relatively smaller than the loading amount of the first positive electrode slurry, or the rolling rate of the second positive electrode mixture layer is set to be smaller than the rolling rate of the first positive electrode mixture layer, and thus the rolling density of the second positive electrode mixture layer is smaller than the rolling density of the first positive electrode mixture layer.

Further, since the increase of the rolling density of the first positive electrode mixture layer arranged in the central portion of the coated part is desirable for the implementation of a high energy density, the rolling density of the first positive electrode mixture layer is preferably greater than the rolling density of the second positive electrode mixture layer.

in one specific example, a ratio (b/a) of a rolling density (b) of the second positive electrode mixture layer to a rolling density (a) of the first positive electrode mixture layer corresponds to 0.5 to 0.9, and preferably 0.6 to 0.8.

In one specific example, a width of the second positive electrode mixture layer may correspond to 1 to 15% of a width of the first positive electrode mixture layer. Referring to FIG. 1, the width length W2 of the second positive electrode mixture layer may be defined as the sum of the width length W2a of the second positive electrode mixture layer of the left edge of the coated part and the width length W2b of the second positive electrode mixture layer of the right edge of the coated part, and the sum (W2a+W2b) may correspond to 1 to 15% of the width length W1 of the first positive electrode mixture layer. When the width length of the second positive electrode mixture layer satisfies the numerical range, it is preferable in implementing a high energy density while inhibiting the reaction of nickel in the positive electrode active material with moisture. The length of the width of the second positive electrode mixture layer may preferably correspond to 3 to 12%, more preferably 5 to 10%, of that of the first positive electrode mixture layer.

Hereinafter, a method of manufacturing an electrode sheet according to the present invention will be described.

A method of manufacturing an electrode sheet according to an embodiment of the present invention includes: an application process of forming a first positive electrode mixture layer and a second positive electrode mixture layer by applying a first positive electrode slurry containing the first positive electrode active material and a second positive electrode slurry containing the second positive electrode active material on a current collector sheet; a drying process; and a rolling process, wherein, in the application process, the second positive electrode slurry is applied in a direction parallel to an application direction of the first positive electrode slurry at one or both ends of the first positive electrode slurry, based on a width direction of the electrode sheet, and wherein in the rolling process, a rolling density of the second positive electrode mixture layer is smaller than a rolling density of the first positive electrode mixture layer.

In one specific example, in order to suppress the increase of the surface area of the positive electrode active material in the second positive electrode mixture layer after rolling, the loading amount per unit area of the second positive electrode mixture layer is preferably designed to be relatively smaller than the loading amount per unit area of the first positive electrode mixture layer during the application process. When assuming that the same pressure is applied to the second positive electrode mixture layer and the first positive electrode mixture layer during rolling, generation of fine powder of the positive electrode active material in the second positive electrode mixture layer may be relatively suppressed, and the first positive electrode mixture layer may be set to have a predetermined energy density by setting the loading amount per unit area of the second positive electrode mixture layer to be smaller than the loading amount per unit area of the first positive electrode mixture layer. Further, the loading amount has been designed in consideration of the N/P ratio in the portion corresponding to the second positive electrode mixture layer. The precipitation of lithium can be effectively prevented by setting the loading amount per unit area of the second positive electrode mixture layer to be smaller than the loading amount per unit area of the first positive electrode mixture layer. At this time, the ratio (B/A) of the loading amount (B) per unit area of the second positive electrode mixture layer to the loading amount (A) per unit area of the first positive electrode mixture layer may be 0.7 to 0.99, more preferably 0.75 to 0.95, and most preferably 0.8 to 0.9.

In another specific example, the rolling rate of the second positive electrode mixture layer may be set to be different from that of the first positive electrode mixture layer in order to suppress the increase in the surface area of the positive electrode active material in the second positive electrode mixture layer after rolling. By setting the rolling rate of the first positive electrode mixture layer to be greater than that of the second positive electrode mixture layer, it is possible to prevent generation of fine powder during the rolling process while allowing to have a predetermined energy density. In the present invention, the rolling rate may be defined as a rolling strength. That is, it can be defined as the size of the force per unit area applied to the positive electrode mixture layer during rolling, and the measurement method is not particularly limited as long as it is to measure the force applied per unit area.

In the method of manufacturing an electrode sheet of the present invention, the first positive electrode active material contained in the first positive electrode mixture layer, the second positive electrode active material contained in the second positive electrode mixture layer, and each rolling density of the first positive electrode mixture layer and the second positive electrode mixture layer have already been described above.

In the application process, a width of the second positive mixture material layer may correspond to 1 to 15% of a width of the first positive electrode mixture layer. When the width length of the second positive electrode mixture layer satisfies the numerical range, it is preferable in implementing a high energy density while inhibiting the reaction of nickel in the positive electrode active material with moisture.

The manufacturing method according to an embodiment of the present invention may be to simultaneously apply the first positive electrode slurry and the second positive electrode slurry, or to apply the first positive electrode slurry and then apply the second positive electrode slurry. According to the above-described method, the productivity may be improved by simultaneously applying the first positive electrode slurry and the second positive electrode slurry.

Hereinafter, a lithium secondary battery of the present invention will be described. A lithium secondary battery of the present invention includes a positive electrode generated by cutting the coated part and the non-coated part of the electrode sheet according to a shape and a size of a unit electrode.

The positive electrode includes a positive electrode current collector and a first positive electrode mixture layer and a second positive electrode mixture layer formed on the positive electrode current collector.

Further, the porosity of the second positive electrode mixture layer may be greater than the porosity of the first positive electrode mixture layer by adjusting the rolling rate of the second positive electrode mixture layer to become smaller than that of the first positive electrode mixture layer. In the present specification, the porosity can be defined as follows:

$$\text{Porosity} = \text{Pore volume per unit mass}/(\text{specific volume} + \text{pore volume per unit mass})$$

The measurement of the porosity is not particularly limited, and it may be measured by Hg porosimetry or Brunauer-Emmett-Teller (BET) measuring method which uses BELSORP (BET equipment) of BEL JAPAN Company using adsorbing gas such as nitrogen.

The positive electrode current collector is not particularly limited as long as it has conductivity without causing a chemical change in a battery. Examples of the positive electrode current collector include stainless steel, aluminum, nickel, titanium, sintered carbon or aluminum or stainless steel of which the surface has been treated with carbon, nickel, titanium, silver, or the like. Further, the positive electrode current collector may generally have a thickness of 3 to 500 µm, and it is possible to increase the adhesive force of the positive electrode active material by forming minute irregularities on the surface of the positive electrode current collector. It may be used as various forms such as a film, a sheet, a foil, a net, a porous body, a foam, and a nonwoven fabric.

The first positive electrode mixture layer may include a conductive material and a binder together with the above-described first positive electrode active material, and the second positive electrode mixture layer may also include a conductive material and a binder together with the second positive electrode active material.

The conductive material is used to give conductivity to the electrode, and any conductive material may be used without limitation as long as it has electric conductivity and does not cause a chemical change in the battery. Some examples of the conductive material include: graphite, such as natural graphite and artificial graphite; a carbon-based material such as carbon black, acetylene black, ketjen black, channel black, furnace black, lamp black, summer black, or carbon fiber; metal powders or metal fibers such as cooper, nickel, aluminum or silver; conductive whiskey such as zinc oxide and potassium titanate; conductive metal oxides such as titanium oxide; conducting polymers such as polyphenylene derivatives, and one or a mixture thereof may be used. The conductive material may generally be included in a 1 to 30% by weight based on the total weight of the positive electrode material layer.

The binder improves the adhesive force between the positive electrode active material and the positive electrode current collector and attachment between positive electrode active material particles. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene polymer (EPDM), sulfonated-EPDM, styrene butadiene rubber (SBR), fluororubber, or various copolymers thereof, and one kind or a mixture of two or more kinds of them may be used. The binder may be included in a 1 to 30% by weight based on the total weight of the positive electrode material layer.

The positive electrode may be manufactured according to a general positive electrode manufacturing method except that the first positive electrode mixture layer is applied on the central portion, and the second positive electrode mixture layer is applied on both edges using a dual slot-die coater by using the positive electrode active material, and the rolling rate of the first positive electrode mixture layer and the second positive electrode mixture layer is different at the time of rolling. Specifically, it may be manufactured by supplying a positive electrode slurry for formation of a positive electrode mixture layer including the positive electrode active material and selectively a binder and a conductive material to a dual slot-die coater, applying the positive electrode slurry on the positive electrode current collector using the dual slot-die coater, and drying and rolling the positive electrode current collector. At this time, the type and the content of the positive electrode material, the binder, and the conductive material are as described above.

The solvent of the positive electrode slurry may be a solvent generally used in the art, such as dimethyl sulfoxide (DMSO), isopropyl alcohol, N-methylpyrrolidone (NMP), acetone, or water, and one of them alone or a mixture of two or more may be used. The amount of use of the solvent is sufficient if it can dissolve or disperse the positive electrode active material, the conductive material and the binder in consideration of the application thickness and production yield, and later allow a viscosity for showing an excellent thickness uniformity at the time of application for preparation of a positive electrode.

Specifically, the lithium secondary battery includes a positive electrode, a negative electrode facing against the positive electrode, a separator interposed between the positive electrode and the negative electrode, and an electrolyte, and the positive electrode has been described above. Further, the lithium secondary battery may selectively further include a battery case for accommodating the electrode assembly of the positive electrode, the negative electrode and the separator, and a sealing member for sealing the battery case.

The negative electrode current collector is not particularly limited as long as it has high electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. Further, the negative electrode current collector may generally have a thickness of 3 to 500 µm, and may strengthen the coupling force of the negative electrode active material by forming minute irregularities on the surface of the current collector as in the positive electrode current collector. It may be used as various forms such as a film, a sheet, a foil, a net, a porous body, a foam, and a nonwoven fabric.

The negative electrode mixture layer includes a negative electrode active material, and selectively a binder, and a conductive material. The negative electrode mixture layer may be manufactured by applying a slurry for forming a negative electrode containing a negative electrode active material and selectively a binder and a conductive material on a negative electrode current collector and drying them, or by casting the slurry for forming the negative electrode on a separate support and then laminating a film, obtained by peeling the slurry from the support on the negative electrode current collector.

A compound, in which a reversible intercalation and deintercalation of lithium is possible, may be used as the negative electrode active material. Specific examples thereof include carbonaceous materials such as artificial graphite, natural graphite, graphitized carbon fiber and amorphous carbon; A metal compound capable of alloying with lithium such as Si, Al, Sn, Pb, Zn, Bi, In, Mg, Ga, Cd, Si alloy, Sn alloy or Al alloy; Metal oxides such as $SiO_x$ ($0<x<2$), $SnO_2$, vanadium oxide, and lithium vanadium oxide that can dope and dedope lithium; or a composite containing the above-described metallic compound and a carbonaceous material such as a Si—C composite or a Sn—C composite, and any one or a mixture of two or more of them. In addition, a metal lithium thin film may be used as the negative electrode active material. As the carbon material, both low-crystalline carbon and high-crystalline carbon may be used. Examples of the low-crystalline carbon include soft carbon and hard carbon. Examples of the highly crystalline carbon include amorphous, flaky, scaly, spherical or fibrous natural graphite natural graphite or artificial graphite, Kish graphite, pyrolytic carbon, mesophase pitch based carbon fiber, mesocarbon microbeads, mesophase pitches and high-temperature calcined carbon, such as petroleum or coal tar pitch derived cokes.

In addition, the binder and the conductive material may be the same as described in the positive electrode previously.

Meanwhile, in the lithium secondary battery, the separator is used to separate the negative electrode from the positive electrode and provide a moving path of lithium ions, and any separator generally used in a lithium secondary battery may be used without any special limitation. In particular, a separator having a high electrolyte solution moisturization capability and a low resistance to ion movement of electrolyte solution is preferred.

Specifically, porous polymer films, for example, porous polymer films made of polyolefin-based polymers such as ethylene homopolymers, propylene homopolymers, ethylene/butene copolymers, ethylene/hexene copolymers and ethylene/methacrylate copolymers, or a laminate of two or more thereof may be used. Further, a nonwoven fabric made of a conventional porous nonwoven fabric, for example, glass fiber of high melting point, polyethylene terephthalate fiber, or the like may be used. In order to secure heat resistance or mechanical strength, a coated separator containing a ceramic component or a polymer material may be used, and may be optionally used as a single layer or a multilayer structure.

Further, examples of the electrolyte used in the present invention include an organic liquid electrolyte, an inorganic liquid electrolyte, a solid polymer electrolyte, a gel polymer electrolyte, a solid inorganic electrolyte, and a molten inorganic electrolyte which can be used in the production of a lithium secondary battery, but the present invention is not limited to these examples.

Specifically, the electrolyte may include an organic solvent and a lithium salt.

The organic solvent may be any organic solvent that can act as a medium through which ions involved in an electrochemical reaction of a battery can move. Specifically, examples of the organic solvent include ester solvents such as methyl acetate, ethyl acetate, γ-butyrolactone and ε-caprolactone; ether solvents such as dibutyl ether or tetrahydrofuran; ketone solvents such as cyclohexanone; aromatic hydrocarbon solvents such as benzene and fluorobenzene; carbonate solvents such as dimethyl carbonate (DMC), diethylcarbonate (DEC), methylethylcarbonate (MEC), ethylmethylcarbonate (EMC), ethylene carbonate (EC), and propylene carbonate (PC); alcohol solvents such as ethyl alcohol and isopropyl alcohol; nitriles such as R—CN (R is a straight, branched or cyclic hydrocarbon group of C2 to C20, which may contain a double bond aromatic ring or ether bond); amides such as dimethylformamide; dioxolanes such as 1,3-dioxolane; or sulfolane. Among them, a carbonate-based solvent is preferable, and a mixture of a cyclic carbonate (for example, ethylene carbonate or propylene carbonate) having a high ionic conductivity and a high dielectric constant which can increase the charge/discharge performance of a battery, and a linear carbonate compound having a low viscosity (for example, ethyl methyl carbonate, dimethyl carbonate or diethyl carbonate) is more preferable. In this case, when the cyclic carbonate and the chain carbonate are mixed in a volume ratio of about 1:1 to about 1:9, the performance of the electrolytic solution may be excellent.

The lithium salt can be used without any particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The concentration of the lithium salt is preferably within the range of 0.1 to 2.0M. When the concentration of the lithium salt is within the above range, the electrolyte has an appropriate conductivity and viscosity, so that it can exhibit excellent electrolyte performance and the lithium ions can effectively move.

In addition to the electrolyte components, in order to improve the life characteristics of the battery, inhibit the battery capacity reduction, and improve the discharge capacity of the battery, the electrolyte may contain one or more additives, such as a haloalkylene carbonate-based compound such as difluoroethylene carbonate, pyridine, triethyl phosphite, triethanolamine, cyclic ether, ethylene diamine, n-glyme, and hexa phosphate triamide, nitrobenzene derivative, sulfur, quinone imine dye, N-substituted oxazolidinone, N, N-substituted imidazolidine, ethylene glycol dialkyl ether, ammonium salt, pyrrole, 2-methoxy ethanol or, aluminum trichloride. Herein, the additive may be included in an amount of 0.1 wt % to 5 wt % based on the total weight of the electrolyte.

Lithium secondary batteries including a positive electrode according to the present invention are useful for portable devices such as mobile phones, laptop computers, and digital cameras and electric cars such as hybrid electric vehicles because the lithium secondary batteries stably show excellent discharge capacity, output characteristics, and capacity retention rate.

According to another embodiment of the present invention, there is provided a battery module including the lithium secondary battery as a unit cell and a battery pack including the same. The battery module or the battery pack may be used as a middle or large size device power source of one or more of a power tool; an electric vehicle including an electric vehicle (EV), a hybrid electric vehicle, and a plug-in hybrid electric vehicle (PHEV); or a system for power storage.

Hereinafter, embodiments of the present invention will be described in detail so that those skilled in the art can easily carry out the present invention. The present invention may, however, be embodied in many different forms and should not be construed as limited to the embodiments set forth herein.

Example 1

(Preparation of First Positive Electrode Slurry for Formation of First Positive Electrode Mixture Layer)

A first positive electrode active material (NCM811, $D_{50}$ is 11 μm) containing the nickel content of 80 mol % based on the total transition metal as the transition metal oxide of lithium-nickel-cobalt-manganese was prepared, which was then mixed with the carbon black conductive material and PVDF binder at the weight ratio of 96.5:1.5:2 in the solvent of N-methyl pyrrolidone, to thereby manufacture a first positive electrode slurry (viscosity: 5000 Pa·s).

(Preparation of Second Positive Electrode Slurry for Formation of Second Positive Electrode Mixture Layer)

A second positive electrode active material (NCM622, $D_{50}$ is 11 μm) containing the nickel content of 60 mol % based on the total transition metal as the transition metal oxide of lithium-nickel-cobalt-manganese was prepared, which was then mixed with the carbon black conductive material and PVDF binder at the weight ratio of 96.5:1.5:2 in the solvent of N-methyl pyrrolidone, to thereby manufacture a second positive electrode slurry (viscosity: 5000 Pa·s).

(Preparation and Storage of Positive Electrode Sheet)

The first positive electrode slurry and the second positive electrode slurry were supplied to the dual slot-die coater, and then the first positive electrode mixture layer and the second positive electrode mixture layer were formed by simultaneously applying the first positive electrode slurry and the second positive electrode slurry on one surface of the aluminum current collector sheet using the coater. At this time, the first positive electrode slurry was set to be applied on the coated portion of the slurry coating portion, and the second positive electrode slurry was set to be applied on both edge regions of the coating portion of the first positive electrode slurry. The total sum of the width length of the coating portion of the second positive electrode slurry was set to correspond to 8% of the width length of the coating portion of the first positive electrode slurry. At this time, the loading amount per unit area of the first positive electrode slurry is 700 mg/25 cm³, and the loading amount per unit area of the second positive electrode slurry is 560 mg/25 cm³. Herein, the ratio (B/A) of the loading amount per unit area (B) of the second positive electrode mixture layer to the loading amount per unit area (A) of the first positive electrode mixture layer was set to be 0.8. Thereafter, a positive electrode sheet including a first positive electrode mixture layer and a second positive electrode mixture layer was dried at 130° C., and rolled. As a result of measuring each rolling density of the first positive electrode mixture layer and the second positive electrode mixture layer after rolling, the rolling density of the first positive electrode mixture layer was 3.8 g/cm³ and the rolling density of the second positive electrode mixture layer was 2.47 g/cm³, and the ratio (b/a) of the rolling density (b) of the second positive electrode mixture layer to the rolling density (a) of the first positive electrode mixture layer was 0.65. Herein, the rolling density was calculated by obtaining the positive electrode of each specific area from the first positive electrode mixture layer and the second positive electrode mixture layer of the electrode sheet, and then performing measurement of the mass and volume.

Likewise, the prepared positive electrode sheet was wound in the form of a roll, which was then stored in a room temperature of 25° C. for 7 days, and then a positive electrode tab was notched in the non-coated part of the positive electrode sheet, and the positive electrode sheet was slitted, to thereby manufacture a positive electrode.

(Battery Preparation)

A porous polyolefin separator was interposed between the positive electrode and the lithium metal as the negative electrode, to thereby prepare an electrode assembly, which was then located inside a case, and an electrolyte solution was injected into the case, to thereby manufacture a lithium secondary battery. At this time, lithium hexafluorophosphate ($LiPF_6$) of 1.0M concentration was dissolved in an organic solvent consisting of ethylene carbonate/dimethyl carbonate/ethyl methylcarbonate (EC/DMC/EMC volume ratio=3/4/3) to manufacture the electrolyte solution.

Examples 2 to 3

A battery was manufactured in the same manner as in Example 1 except that the loading amount per unit area of the second positive electrode slurry and the rolling density of the second positive electrode mixture layer in Example 1 were changed as shown in Table 1.

Example 4

A battery was manufactured in the same manner as in the example 1 except that the second positive electrode active material contained in the second positive electrode slurry in Example 1 was changed to one having ⅓ nickel content (NCM 111, $D_{50}$ is 11 μm), and the loading amount per unit area of the second positive electrode slurry and the rolling density of the second positive electrode mixture layer were changed as in Table 1.

Comparative Examples 1 to 2

A battery was manufactured in the same manner as in Example 1 except that the loading amount per unit area of the second positive electrode slurry and the rolling density of the second positive electrode mixture layer in Example 1 were changed as shown in Table 1.

Experimental Example: Evaluation of Capacity and Lifespan Characteristics

The initial (first) charge/discharge was performed using the electrochemical charge-discharge device for the lithium secondary battery of examples 1 to 4 and comparative examples 1 to 2. At this time, the charge was performed by applying electric current with the current density of ⅓ C-rate until reaching the voltage of 4.2V, and the discharge was performed with the same current density until reaching 2.5V. This charge/discharge was carried out a total of 500 times.

The capacity of each battery was measured in the charge/discharge process as described above.

The capacity retention rate of each battery was calculated therefrom as follows, and the result is shown in Table 2.

Capacity retention rate (%)=(capacity in 500 cycles/initial capacity)×100

TABLE 2

|  | Initial discharge capacity (mAh/g) | Capacity retention rate (%/500cycle) |
| --- | --- | --- |
| Example 1 | 39.4 | 88.5 |
| Example 2 | 40.4 | 90.8 |
| Example 3 | 42.1 | 91.5 |
| Example 4 | 40.9 | 89.9 |
| Comparative Example 1 | 44.2 | 85.1 |
| Comparative Example 2 | 35.8 | 87.2 |

Referring to Table 2, the initial discharge capacity in the comparative example 1 was greater than that in the examples 1 to 4, but the capacity retention rate after 500 cycles in the comparative example 1 was smaller than that in the examples 1 to 4. The reason why the initial capacity of the comparative example 1 was great seemed to be because the rolling density of the second positive electrode mixture layer in the comparative example 1 was relatively greater than that in the examples 1 to 4. Further, the capacity retention rate of the comparative example 1 is worst because in the second positive electrode mixture layer of the comparative example 1, a lot of coarse powder is generated during rolling, thereby becoming vulnerable to moisture, and thus as the charge/discharge is repeated, gas generation increases and resis-

TABLE 1

| | Loading amount per unit area | | | Rolling density | | |
| --- | --- | --- | --- | --- | --- | --- |
| | First positive electrode slurry loading amount (A) | Second positive electrode slurry loading amount (B) | Ratio (B/A) of loading amounts per unit area | First positive electrode mixture layer (a) | Second positive electrode mixture layer (b) | Ratio (b/a) of rolling densities |
| Example 1 | 700 mg/25 cm² | 560 mg/25 cm² | 0.8 | 3.8 g/cm³ | 2.47 g/cm³ | 0.65 |
| Example 2 | | 595 mg/25 cm² | 0.85 | | 2.66 g/cm³ | 0.7 |
| Example 3 | | 630 mg/25 cm² | 0.9 | | 3.04 g/cm³ | 0.8 |
| Example 4 | | 595 mg/25 cm² | 0.85 | | 2.85 g/cm³ | 0.75 |
| Comparative Example 1 | | 770 mg/25 cm² | 1.1 | | 4.0 g/cm³ | 1.05 |
| Comparative Example 2 | | 350 mg/25 cm² | 0.5 | | 1.71 g/cm³ | 0.45 | tance increases due to the nickel reacting with moisture, thereby deteriorating the lifespan performance.

Further, the initial discharge capacity and capacity retention rate in the comparative example 2 were smaller than those in examples 1 to 4. The reason why the initial capacity of the comparative example 2 was the smallest seemed to be because the rolling density of the second positive electrode mixture layer of the comparative example 2 was the smallest. Further, when the ratio (b/a) of the rolling density (b) of the second positive electrode mixture layer to the rolling density (a) of the first positive electrode mixture layer was too small, it was not desirable in terms of the capacity retention rate.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

The invention claimed is:

1. An electrode sheet including a positive electrode mixture layer including a non-coated part and a coated part, and disposed on at least one surface of a current collector,
    wherein the coated part includes:
    a first positive electrode mixture layer disposed on a central portion along a longitudinal direction of the electrode sheet and containing a first positive electrode active material including lithium-nickel-cobalt-manganese oxide; and
    a second positive electrode mixture layer disposed adjacent to one or two sides of the first positive electrode mixture layer in the longitudinal direction and containing a second positive electrode active material having a nickel content lower than a nickel content of the first positive electrode active material,
    wherein a rolling density (b) of the second positive electrode mixture layer is smaller than a rolling density (a) of the first positive electrode mixture layer.

2. The electrode sheet of claim 1, wherein the nickel content in the first positive electrode active material is 70 mol % or more of an entire transition metal content in the first positive electrode active material.

3. The electrode sheet of claim 1, wherein the nickel content in the second positive electrode active material is less than 70 mol % of an entire transition metal content in the second positive electrode active material.

4. The electrode sheet of claim 3, wherein the nickel content in the second positive electrode active material is 45 to 60 mol % of an entire transition metal content in the second positive electrode active material.

5. The electrode sheet of claim 1, wherein a ratio (b/a) of the rolling density (b) of the second positive electrode mixture layer to the rolling density (a) of the first positive electrode active material layer is 0.5 to 0.9.

6. The electrode sheet of claim 1, wherein the rolling density (a) of the first positive electrode mixture layer is 2.5 g/cm$^3$ to 4.3 g/cm$^3$.

7. The electrode sheet of claim 1, wherein a width of the second positive electrode mixture layer is 1 to 15% of a width of the first positive electrode mixture layer.

8. A lithium secondary battery including a positive electrode generated by cutting the coated part and the non-coated part of the electrode sheet according to claim 1 according to a shape and a size of a unit electrode.

9. A method of manufacturing the electrode sheet according to claim 1, comprising:
    forming the first positive electrode mixture layer and the second positive electrode mixture layer by applying a first positive electrode slurry containing the first positive electrode active material and a second positive electrode slurry containing the second positive electrode active material on a current collector sheet;
    drying the first positive electrode mixture layer and the second positive electrode mixture layer; and
    rolling the first positive electrode mixture layer and the second positive electrode mixture layer,
    wherein, in the forming the first positive electrode mixture layer and the second positive electrode mixture layer, the second positive electrode slurry is applied on the current collector sheet in a direction parallel to an application direction of the first positive electrode slurry adjacent to the one or both ends of the first positive electrode slurry, based on a width direction of the electrode sheet, and
    wherein in the rolling process, the rolling density (b) of the second positive electrode mixture layer is smaller than the rolling density (a) of the first positive electrode mixture layer.

10. The method of claim 9, wherein in the forming the first positive electrode mixture layer and the second positive electrode mixture layer, a nickel content in the second positive electrode active material is 45 to 60 mol % of an entire transition metal content in the second positive electrode active material.

11. The method of claim 9, wherein in the application process, a loading amount per unit area of the second positive electrode mixture layer is smaller than a loading amount per unit area of the first positive electrode mixture layer.

12. The method of claim 11, wherein in the forming the first positive electrode mixture layer and the second positive electrode mixture layer, a ratio (B/A) of the loading amount (B) per unit area of the second positive electrode mixture layer to the loading amount (A) per unit area of the first positive electrode mixture layer is 0.7 to 0.99.

13. The method of claim 9, wherein a ratio (b/a) of the rolling density (b) of the second positive electrode mixture layer to the rolling density (a) of the first positive electrode mixture layer is 0.5 to 0.9.

14. The method of claim 9, wherein in the application process, a length of a width of the second positive electrode mixture layer corresponds to 1 to 15% of a length of a width of the first positive electrode mixture layer.

15. The method of claim 9, wherein in the forming the first positive electrode mixture layer and the second positive electrode mixture layer, the first positive electrode slurry and the second positive electrode slurry are simultaneously applied.

* * * * *